Patented July 16, 1946

2,404,292

UNITED STATES PATENT OFFICE 2,404,292

METHACRYLIC ESTER AND COPOLYMERS THEREOF

Mark Hyman, Jr., Cambridge, Mass., assignor to Polaroid Corporation, Cambridge, Mass., a corporation of Delaware No Drawing. Application March 3, 1943, Serial No. 477,851

1 Claim. (Cl. 260—486)

This invention relates to synthetic resins and plastics and more particularly to new and improved resins from the class consisting of methacrylates of alcohols in which an ether group is attached to a radical comprising an aryl group.

One object of the invention is to provide compounds from the said class which are useful in the formation of hard, transparent, optical elements possessing a relatively high index of refraction.

A further object is to provide a copolymer formed from a methacrylate of the above defined class and other polymerizable unsaturated methylene compounds.

Other objects of the invention will in part be obvious and will in part appear hereinafter.

There is a pressing demand for a synthetic resin composition which may be used in the formation of optical elements such, for example, as lenses, prisms, and the like and which may preferably be cast or molded to the desired form. A preferred resin is one which may be cast into the desired form by, for example, polymerizing the monomer in a suitable mold or by advancing the polymerization of the partially polymerized material in a suitable mold. This invention contemplates the provision of new synthetic resins or plastics which are particularly useful in the production of products of the character described. More specifically, this invention contemplates the provision of synthetic resins which, when polymerized, give a transparent, substantially colorless product having a relatively high index of refraction and which is suitable for use in the production of optical elements of the character described.

The compositions of the present invention comprise compounds from the class consisting of methacrylic esters of alcohols in which an ether group is attached to a radical comprising an aryl group, i. e. to an aryl or alkaryl radical, such as phenyl Cellosolve methacrylate, p-methoxy benzyl methacrylate, benzyl Cellosolve methacrylate, alpha-phenyl alpha'-methyl glyceryl ether methacrylate, 1-phenoxy-2 propyl methacrylate (the methacrylic ester of 1-phenoxy-propanol-2), and eugenol methacrylate, and copolymers of compounds from said class with other unsaturated methylene compounds.

The novel plastic compositions of the present invention may be produced in the following manner, which is illustrative of one method of preparing phenyl Cellosolve methacrylate: To a mixture of 250 c. c. of phenyl cellosolve, 260 c. c. of methyl methacrylate and a small quantity of hydroquinone or other suitable polymerization inhibitor, there is added a small amount of suitable catalyst such as a solution of sodium methylate in methanol. The methanol is slowly distilled off as it is formed by the ester interchange, the temperature of the still head being kept below 68 degrees C. so as not to carry over too much of the unreacted methyl methacrylate. The reaction product is filtered and fractionally distilled, taking as product the fraction boiling at 110 degrees C. at 3 mm. The product is preferably washed with NaOH solution, and then with water, and is thereafter dried over anhydrous $Na_2SO_4$.

The polymeric phenyl cellosolve methacrylate has an index of refraction $(n_D{}^{20})$ of 1.557 and a reciprocal dispersion of 35.

It will be apparent to those skilled in the art that the other compositions of the present invention may be synthesized in the above manner, as for example, p-methoxy benzyl methacrylate may be obtained by using a suitable quantity of p-methoxy benzyl alcohol instead of phenyl Cellosolve.

Under certain conditions, it may be preferable to provide a copolymer which has as one of its constituents phenyl Cellosolve methacrylate and, as its other constituent, a plastic whose polymers are somewhat harder. This is especially true where a high index of refraction is not required. In this connection it should be noted that methacrylates from the class comprising esters of alcohols in which an ether group is attached to an aryl or alkaryl radical may satisfactorily be copolymerized with virtually all the polymerizable unsaturated methylene compounds to produce products having diverse and varied physical and optical properties. Suitable compounds for use in forming copolymers of the type described are methyl methacrylate, ethyl methacrylate, isopropyl methacrylate, ter-butyl methacrylate, cyclohexyl methacrylate and other esters of alpha-methacrylic acid; the vinyl esters such as vinyl formate, vinyl acetate, vinyl propionate and the vinyl ester of chloracetic acid, etc.; the vinyl ketones such as methyl vinyl ketone; styrene; and furylethylene (vinyl furan). Other suitable materials for use in the formation of copolymers falling within the scope of this invention are the esters of itaconic acid and the esters of methylene malonic acid.

It is to be understood that the list of substances given is not all-inclusive although it is believed that the materials mentioned constitute the preferred substances for use in the present invention.

It is also to be understood that, if desired, hardening agents may be employed in small or substantial percentages. Any of a vast number of suitable hardening agents may be used. A preferred hardening agent for use with copolymers comprising methyl methacrylate is either methacrylic acid or acrylic acid, although other known hardening agents such as methacrylic anhydride or allyl methacrylate may be used successfully.

While a preferred product is one which is transparent and which may be molded during polymerization into a suitable optical element, it is to be understood that products which are translucent or even opaque and hence useless in the formation of optical elements may be satisfactorily employed for other purposes where readily moldable, polymerized plastics are desirable, and such products comprising a material from the class consisting of methacrylic esters of alcohols having an ether group attached to a radical containing an aryl group are to be deemed to fall within the scope of this invention.

Polymerization of the products of the invention may be accomplished preferably by heating mixtures of monomers or the slightly polymerized materials at relatively low temperatures, or just above the melting point of the monomer, until a hard product is obtained, when polymerization may be carried forward to a desired point at substantially increased temperatures. Higher temperatures of polymerization generally increase the brittleness of the product. It is, of course, to be understood that where molded optical elements are to be produced, the surfaces of the mold should be optically smooth as the molded product will have substantially the surface properties of the mold.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

p-Methoxy benzyl methacrylate.

MARK HYMAN, JR.